(12) United States Patent
Sillankorva

(10) Patent No.: US 11,556,326 B2
(45) Date of Patent: Jan. 17, 2023

(54) METHODS FOR PERFORMING A ROLLBACK-CAPABLE SOFTWARE UPDATE AT A DEVICE

(71) Applicant: Arm Limited, Cambridge (GB)

(72) Inventor: Simo Mikael Sillankorva, Oulu (FI)

(73) Assignee: ARM LIMITED, Cambridge (GB)

( * ) Notice: Subject to any disclaimer, the term of this patent is extended or adjusted under 35 U.S.C. 154(b) by 188 days.

(21) Appl. No.: 16/123,200

(22) Filed: Sep. 6, 2018

(65) Prior Publication Data

US 2020/0081697 A1    Mar. 12, 2020

(51) Int. Cl.
*G06F 8/30* (2018.01)
*G06F 8/65* (2018.01)
*G06F 8/61* (2018.01)
*H04L 67/00* (2022.01)
*G06F 9/4401* (2018.01)

(52) U.S. Cl.
CPC ............ *G06F 8/62* (2013.01); *G06F 8/30* (2013.01); *G06F 8/65* (2013.01); *G06F 9/4401* (2013.01); *H04L 67/34* (2013.01)

(58) Field of Classification Search
CPC ..... G06F 8/62; G06F 8/30; G06F 8/65; G06F 9/4401; G06F 8/71; G06F 8/658; H04L 67/34; H04W 4/50
See application file for complete search history.

(56) References Cited

U.S. PATENT DOCUMENTS

| 8,306,954 | B2* | 11/2012 | Srivastava | G06F 16/27 |
| | | | | 707/690 |
| 9,092,243 | B2* | 7/2015 | Faus | G06F 8/36 |
| 9,549,022 | B2* | 1/2017 | Brookins | H04N 21/6125 |
| 2003/0212712 | A1* | 11/2003 | Gu | G06F 16/10 |
| 2004/0220980 | A1* | 11/2004 | Forster | G06F 11/1451 |
| 2005/0071385 | A1* | 3/2005 | Rao | G06F 8/65 |
| 2005/0144186 | A1* | 6/2005 | Hesselink | H04L 67/06 |
| 2014/0020095 | A1* | 1/2014 | Riou | G06F 21/64 |
| | | | | 726/22 |
| 2014/0064048 | A1* | 3/2014 | Cohen | G06F 3/0613 |
| | | | | 369/47.15 |
| 2014/0122425 | A1* | 5/2014 | Poirier | G06F 16/1756 |
| | | | | 707/610 |
| 2016/0026452 | A1* | 1/2016 | Dani | G06F 8/71 |
| | | | | 717/170 |
| 2016/0041819 | A1* | 2/2016 | Mantena | G06F 8/65 |
| | | | | 717/170 |
| 2016/0188317 | A1* | 6/2016 | Hilliar | H04W 12/0023 |
| | | | | 717/172 |

(Continued)

FOREIGN PATENT DOCUMENTS

| CN | 107046605 A | * | 8/2017 | |
| CN | 110647333 A | * | 1/2020 | |
| WO | WO-2019229091 A1 | * | 12/2019 | G06F 8/658 |

*Primary Examiner* — Daxin Wu

(74) *Attorney, Agent, or Firm* — Nixon & Vanderhye, PC

(57) ABSTRACT

Methods are described herein for creating and installing software updates which may be rolled back, without requiring large processing capabilities and/or large storage capacity at a device. Delta software updates are determined comprising differences, on a bit-level, between a first version of the software and a second, updated, version of the software, and metadata defining how to apply the differences. Methods of performing a rollback-capable update at a device are also described herein.

19 Claims, 6 Drawing Sheets

(56) References Cited

U.S. PATENT DOCUMENTS

| | | | |
|---|---|---|---|
| 2017/0286094 A1* | 10/2017 | Westerkowsky | H04W 4/70 |
| 2017/0322796 A1* | 11/2017 | Kim | G06F 9/4406 |
| 2018/0270290 A1* | 9/2018 | Sinha | G06F 11/2082 |
| 2019/0031203 A1* | 1/2019 | Fox | G06F 8/65 |
| 2019/0163461 A1* | 5/2019 | Jayaraman | G06F 9/44505 |

* cited by examiner

CURRENT VERSION V1

| $1_{V1}$ | $2_{V1}$ | ... | $69_{V1}$ | $70_{V1}$ |

FIGURE 1A

NEW VERSION V2

| $1_{V2}$ | $2_{V2}$ | ... | $49_{V2}$ | $50_{V2}$ | $51_{V1\&2}$ | $52_{V1\&2}$ | ... | $69_{V1\&2}$ | $70_{V1\&2}$ |

FIGURE 1B

DELTA

| METADATA | $1_{XOR}$ | $2_{XOR}$ | ... | $49_{XOR}$ | $50_{XOR}$ |

FIGURE 1C

NEW VERSION V2

| $1_{V2}$ | $2_{V2}$ | ... | $49_{V2}$ | $50_{V2}$ | $51_{V1\&2}$ | $52_{V1\&2}$ | ... | $69_{V1\&2}$ | $70_{V1\&2}$ | $71_{+V2}$ | $72_{+V2}$ | ... | $79_{+V2}$ | $80_{+V2}$ |

FIGURE 3A

DELTA

| METADATA | $1_{XOR}$ | $2_{XOR}$ | ... | $49_{XOR}$ | $50_{XOR}$ | $71_{+V2}$ | $72_{+V2}$ | ... | $79_{+V2}$ | $80_{+V2}$ |

FIGURE 3B

NEW VERSION V2

| $1_{V2}$ | $2_{V2}$ | ... | $49_{V2}$ | $50_{V2}$ | $51_{+V2}$ | $52_{+V2}$ | ... | $59_{+V2}$ | $60_{+V2}$ | $61_{V1\&2}$ | $62_{V1\&2}$ | ... | $79_{V1\&2}$ | $80_{V1\&2}$ |

FIGURE 4A

DELTA

| METADATA | $1_{XOR}$ | $2_{XOR}$ | ... | $49_{XOR}$ | $50_{XOR}$ | $51_{+V2}$ | $52_{+V2}$ | ... | $59_{+V2}$ | $60_{+V2}$ |

FIGURE 4B

DELTA

| METADATA | 1_XOR | 2_XOR | ... | 69_XOR | 70_XOR | 71+V2 | 72+V2 | ... | 79+V2 | 80+V2 |

FIGURE 5

NEW VERSION V2

| 1_V2 | 2_V2 | ... | 49_V2 | 50_V2 |

FIGURE 6A

DELTA

| METADATA | 1_XOR | 2_XOR | ... | 49_XOR | 50_XOR |

FIGURE 6B

ND FOR PERFORMING A
ROLLBACK-CAPABLE SOFTWARE UPDATE
AT A DEVICE

The present techniques relate to methods for performing a rollback-capable software update at a device. More particularly, the techniques relate to methods for performing a rollback-capable software update at a device using bit-difference data indicating the bit-level differences between a first version and a second version of the software.

More and more devices are being connected via the internet, as part of the Internet of Things (IoT). The devices may be relatively large devices having large capacity and capabilities, such as laptop computers, tablets, smart phones etc, or may be relatively constrained devices having limited capacity and capabilities, such as temperature sensors, healthcare monitors, electronic door locks etc. All the devices are likely to require some form of software update during their lifetime, the update being downloaded via the internet and installed at the device. Large devices tend to have a storage capacity capable of storing one or more previous versions of the software until, at least, the current update has been completed successfully, thus enabling the device to rollback to the previous version of the software, if the update does not install correctly. However constrained devices often do not have the capacity to store previous versions of the software.

A delta update is a software update that only requires a device to download the code that has changed, not the whole program. Delta updates are often used to reduce network traffic, to reduce the amount of storage required by an update and to save time. When a new version of a software is available, generally an update server will determine a delta update for each device/group of devices that wants/needs the update. The update server knows which version of software each device is currently running and determines the delta update for each device based on the current version at each device and the new version of the software. The code and data which is required for updating the software can be compressed easily and efficiently using delta algorithms, in order to keep the delta update as small as possible. The delta update may then be sent to the devices which requires the update. However, rollback to the previous version of the software from a delta update generally requires processing and storage capacity and capabilities which are not available in constrained devices.

According to a first technique, there is provided a method for performing a rollback-capable software update at a device. The method comprising: storing, in memory at the device, delta update data to be applied to a first version of software stored in the memory at the device, the delta update data comprising bit-difference data indicating bit-level differences between at least a portion of the first version of the software and at least a portion of a second version of the software and metadata defining how to apply the bit-difference data; applying the bit-difference data to replace in the memory the at least the portion of the first version of the software to generate the second version of the software, and preserving in the memory the delta update data to enable a rollback of the update; and in the event of rollback of the update, rolling back from the second version of the software to the first version of the software by applying the preserved bit-difference data to the at least a portion of the second version of the software in accordance with the preserved metadata.

According to a second technique, there is provided a computer readable storage medium comprising program code for performing the methods described herein.

According to a third technique, there is provided an update server for creating rollback-capable delta update data to be applied to a first version of software at a device. The server comprising: a processing module configured to determine bit-level differences between at least a portion of the first version of the software and at least a portion of a second version of the software and to create delta update data to be applied to the first version of the software, the delta update data comprising bit-difference data indicating the bit-level differences and metadata defining how to apply the bit-difference data; and a communication module configured to transfer the delta update data to one or more devices to enable a first version of the software stored at the device to be updated to a second version.

According to a fourth technique, there is provided rollback-capable delta update data for application to a first version of a software to generate a second version of the software. The delta update data comprising: bit-difference data indicating bit-level differences between at least a portion of the first version of the software and at least a portion of the second version of the software; and metadata defining how to apply the bit-difference data to the first version of the software to generate the second version of the software.

According to a fifth technique, there is provided a computer readable storage medium comprising the rollback-capable delta update data described herein.

Embodiments will now be described with reference to the accompanying figures of which:

FIG. 1A illustrates schematically a first version of software comprising 70 bytes of instructions;

FIG. 1B illustrates schematically a second version of the software of FIG. 1A;

FIG. 1C illustrates schematically delta update data determined based on the first and second versions of the software illustrated in FIGS. 1A and 1B;

FIG. 3A illustrates schematically another version of the software of FIG. 1A;

FIG. 3B illustrates schematically delta update data determined based on the first and second versions of the software illustrated in FIGS. 1A and 3A;

FIG. 4A illustrates schematically another version of the software of FIG. 1A;

FIG. 4B illustrates schematically delta update data determined based on the first and second versions of the software illustrated in FIGS. 1A and 4A;

FIG. 5 illustrates schematically alternative delta update data to that illustrated in FIG. 4B;

FIG. 6A illustrates schematically another version of the software of FIG. 1A;

FIG. 6B illustrates schematically delta update data determined based on the first and second versions of the software illustrated in FIGS. 1A and 6A;

Figure 2:
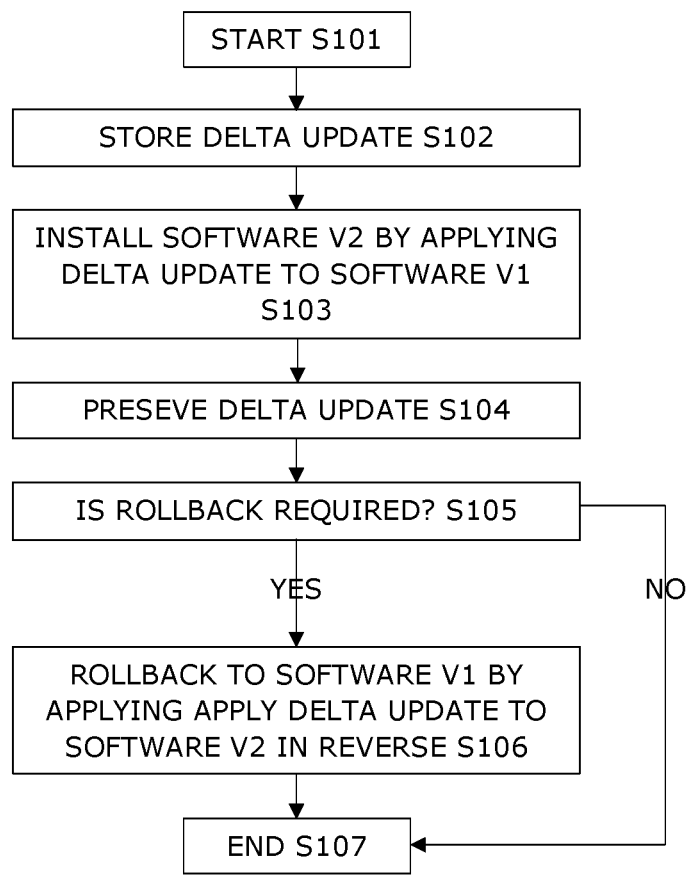
FIG. 2 illustrates schematically a method of performing a rollback-capable software update at a device.

Methods are described herein for creating and installing software updates which may be rolled back, without requiring large processing capabilities and/or large storage capacity at a device. Delta software updates are determined comprising differences, on a bit-level, between a first version of the software and a second, updated, version of the software, and metadata defining how to apply the differences. Methods of performing a rollback-capable update at a device are also described herein.

In the following description software may be configuration data or executable software and refers to a collection of data and/or instructions which inform a device how to configure/operate. Since firmware is a type of software, the following methods equally apply to firmware updates.

Reference will now be made in detail to the embodiments, examples of which are illustrated in the accompanying drawings. In the following detailed description numerous specific details are set forth by way of examples in order to provide a thorough understanding of the relevant teachings. However, it will be apparent to one of ordinary skill in the art that the present teachings may be practiced without these specific details.

In other instances, well known methods, procedures, components and/or circuitry have been described at a relatively high-level, without detail, in order to avoid unnecessarily obscuring aspects of the present teachings.

FIG. 1A illustrates schematically a first (current) version of a software comprising 70 bytes of code. FIG. 1B illustrates schematically a second (new) version of the software also comprising 70 bytes of code. The first 50 bytes of the second version of the software have been changed, whilst the next 20 bytes of the second version of the software are unchanged i.e. they are common to version 1 and version 2 of the software. An update server creates a delta update to be applied to the first (current) version of the software by determining the differences between the two versions of the software on a bit level. For example, an XOR operation is performed on each bit of the 70 bytes of the software. The two inputs of the XOR operation being the same bit of the two different versions of the software. The XOR operation determines which bits of which bytes have been changed, i.e. that the first 50 bytes of the second version of the software have been changed, whilst the next 20 bytes of the second version of the software are unchanged, and the output of the XOR operation for each bit of the changed 50 bytes are utilised in the delta update.

Unlike known delta updates, the delta update described herein comprises bit-difference data indicating the bit-level differences between the portions of the first version of the software and the portions of the second version of the software which have changed, i.e. the output of the XOR operation for each bit of the changed 50 bytes, as opposed to the changed content of the second (new) version of the 50 bytes. For example, if the first bit of the first byte of first (current) version of the software is "1", and the first bit of the first byte of second (new) version of the software is "0", then the output of the XOR operation is "1". Consequently, the delta update comprises a "1" in the first bit of the first byte (i.e. the output of the XOR operation), as opposed to the delta update comprising a "0" in the first bit of the first byte (which is the entry in the first bit of the first byte of second (new) version of the software).

Conventionally, a delta update comprises the code that has changed, such that the bytes of the current version of the code that have changed are overwritten with the new bytes of the code. However, in order to rollback such an update, large processing capabilities are required, or a large storage capacity is required, such that the first and second versions of the software can be stored at the device to enable rollback. In contrast, the delta updates described herein comprise the bit-level differences between the first version and the second version of software, therefore, it is possible to rollback the update at the device without requiring large processing capabilities or large storage capacity at the device, and without losing data.

Rollback to a previous version of the software may be desirable when an update does not install correctly and/or is not completely installed. In addition, a rollback may be required when instructed by a user or a server.

FIG. 1C illustrates schematically delta update data for updating software from the current version illustrated in FIG. 1A to the new version illustrated in FIG. 1B. The delta update data of FIG. 1C comprises bit-difference data indicating the bit-level differences between the first version and a second version of software (i.e. the output of the XOR operation for each bit of the changed 50 bytes). The delta update also comprises metadata. The metadata defines how to apply the bit-difference data, including where to apply the bit-difference data. The metadata is illustrated as being at the start of the data. However, metadata may also be provided at the start of each different section of the data. In addition, the metadata may be included inside a header. The portions of the software that are unchanged do not form part of the delta update therefore, the metadata may also define where to skip unchanged bytes if appropriate.

The metadata defining how to apply the bit-difference data, including where to apply the bit-difference data, may use any known delta update algorithm/protocol.

The update server transfers the determined delta update to one or more devices having version 1 of the software and which require the software update. FIG. 2 illustrates schematically a method of performing a rollback-capable software update at one or more of the devices. The method starts at step S101. At step S102 the delta update data is received and stored at the device. The device currently has version 1 (V1) of the software and requires the software update to version 2 (V2). The software update is installed at the device at step S103. An updated version (V2) of the software is generated at the device by applying the delta update data to the current version (V1) of the software, such that version 2 of the software is installed at the device. At step S104, the stored delta update data is preserved. If a rollback to the previous version of the software (i.e. to software V1) is required at step S105, then the preserved delta update data is applied to the version 2 software at step S106. The process then ends at step S107. Alternatively, if no rollback is required at step S105, then the process moves to step S107 and ends.

According to one embodiment, at step S103, the delta update data is applied to version 1 of the software such that the content of each changed bit of each byte is determined from the delta update data, and the code of version 1 of the software which has been changed is overwritten to create version 2 of the software.

Since the delta update data comprises the bit-level differences between the first version and a second version of software, the delta update data is applied to version 1 of the software. Referring to the simple example given above, when the first bit of the first byte of version 1 of the software is "1", and the delta update data for the first bit of the first byte of the software defines the output of the XOR operation as "1", then it is possible to determine that the first bit of the first byte of version 2 of the software is "0". The "0" is overwritten in the first bit of the first byte in order to create version 2 of the software.

If a rollback to the previous version of the software (i.e. to software V1) is required at step S105, then the preserved delta update data is applied to the version 2 software at step S106. Referring again to the simple example given above, the first bit of the first byte of version 2 of the software is "0", and the preserved delta update data for the first bit of the first byte of the software defines the output of the XOR operation as "1", thus it is possible to determine that the first bit of the first byte of version 1 of the software is "1". The delta update data is applied to version 2 of the software to return to version 1 of the software.

The benefit of using an XOR operation is that it is simple to traverse backwards and forwards between versions of the software. However, although an XOR operation is described herein other operations could also be used to determine the bit-difference data such as an XNOR operation. The output of the XNOR operation is set to "0" when the corresponding bit of the first and second versions of the software has a different value, and the output of the XNOR operation is set to "1" when the corresponding bit of the first and second versions of the software has the same value.

According to one embodiment, the delta update data received at step S102 is temporarily stored at the device. Conventionally, in constrained devices, an update is temporarily stored at a location from which the update can be installed, until the update has been installed, as a result of only limited storage space being available. However, according to the method described herein, following installation, the delta update data is preserved at the device at step S104, for example the delta update data may be moved to a permanent storage area of the device, such as non-volatile memory, as opposed to being deleted or overwritten when storage space is required. Alternatively, the delta update data may be stored in a permanent storage area of the device, such as non-volatile memory, at step S102. According to this embodiment, step S104 is not required, or no action is required at step S104. Since the delta update data is preserved at the device, it is not necessary to store two versions of the software (i.e. the current version and the previous version) in order to be able to rollback to the previous version, it is possible to rollback to the previous version using only the current version of the software and the stored delta update data.

According to one embodiment, the method of installing and/or rolling back an update is performed by the bootloader at the device. The bootloader is provided with the location at which the current version of the software is installed, as known in the art. In addition, the location of the delta update data is known to the bootloader. Whenever a delta update is received at a device, the delta update data is stored/preserved in a predefined delta update location, such that the bootloader is able to locate the delta update data in order to install the update and/or rollback the update.

According to another embodiment, the method of installing and/or rolling back an update may be performed by other suitable components at the device, if required.

The delta update location may store more than one delta update, if required, such that it is possible to rollback from the current version of the software to more than one previous versions of the software. For example, the current version of the software ($S_{v1}$) was installed by applying a delta update ($\delta_1$) to the previous version of the software ($S_{v1-1}$). As described above, in order to rollback to the previous version of the software ($S_{v1-1}$), the delta update ($\delta_1$) is applied to the current version of the software ($S_{v1}$). However, if more than one delta update has been stored, then in order to rollback to the version of the software ($S_{v1-2}$), prior to the previous version of the software ($S_{v1-1}$), then the previous delta update ($\delta_{1-1}$) is applied to the previous version of the software ($S_{v1-1}$). Consequently, it is possible to return to numerous previous versions of the software without storing each entire version of the software. Instead, it is only necessary to store the current version of the software and the previous delta updates. It is also possible to go forward to a newer version of the software again after a rollback using only the delta update(s).

The example described above with reference to FIGS. 1A to 1C illustrates an example where code has been a changed. However, a software update may also require code to be added, code to be moved, code to be deleted etc.

FIG. 3A illustrates schematically another new version of the software illustrated in FIG. 1A. In the software illustrated in FIG. 3A, the first 50 bytes of the software ($1_{V2}$ to $50_{V2}$) have been changed and the next 20 bytes of software ($51_{V1 \& V2}$ to $70_{V1 \& V2}$) are unchanged, i.e. they are common to the current version and the new version of the software, similar to FIG. 1B. However, the software illustrated in FIG. 3A also comprises an additional 10 bytes of software ($71_{+V2}$ to $80_{+V2}$) that have been added to this new version of the software. FIG. 3B illustrates schematically the delta update data for updating the software from the current version illustrated in FIG. 1A to the new version illustrated in FIG. 3A. The delta update data illustrated in FIG. 3B comprises data ($1_{XOR}$ to $50_{XOR}$) indicating the bit-level differences between the current version (FIG. 1A) and the new version (FIG. 3A) of the software, i.e. the output of the XOR operation for each bit of the changed 50 bytes, the 10 new bytes ($71_{+V2}$ to $80_{+V2}$) and metadata. The metadata defines how to apply the bit-difference data, including where to apply the bit-difference data and where to apply the new data. Since bytes $51_{V1 \& V2}$ to $70_{V1 \& V2}$ are unchanged from the current version to the new version of the software they are not included in the delta update. However, the metadata may define that bytes $51_{V1 \& V2}$ to $70_{V1 \& V2}$ are to be skipped.

FIG. 4A illustrates schematically another new version of the software illustrated in FIG. 1A. In the software illustrated in FIG. 4A the first 50 bytes of the software ($1_{V2}$ to $50_{V2}$) have been changed and the last 20 bytes of software ($61_{V1 \& V2}$ to $80_{V1 \& V2}$) are unchanged, i.e. they are common to the current version and the new version of the software, similar to FIG. 1B. However, the last 20 bytes of software ($61_{V1 \& V2}$ to $80_{V1 \& V2}$) have been moved. This is because the software illustrated in FIG. 4A also comprises an additional 10 bytes of software ($51_{+V2}$ to $60_{+V2}$) that have been added to this new version of the software. Unlike FIG. 3A, the additional 10 bytes of software ($51_{+V2}$ to $60_{+V2}$) illustrated in FIG. 4A have been inserted between the changed bytes ($1_{V2}$ to $50_{V2}$) and the unchanged bytes ($61_{V1 \& V2}$ to $80_{V1 \& V2}$) of the software. Consequently, the address of the unchanged bytes ($61_{V1 \& V2}$ to $80_{V1 \& V2}$) of software has been altered, the unchanged bytes ($61_{V1 \& V2}$ to $80_{V1 \& V2}$) have moved.

FIG. 4B illustrates schematically delta update data for updating the software from the current version illustrated in FIG. 1A to the new version illustrated in FIG. 4A. The delta update data illustrated in FIG. 4B comprises data ($1_{XOR}$ to $50_{XOR}$) indicating the bit-level differences between the current version (FIG. 1A) and the new version (FIG. 4A) of the software, i.e. the output of the XOR operation for each bit of the changed 50 bytes, the 10 new bytes ($51_{+V2}$ to $60_{+V2}$) and metadata. The metadata defines how to apply the bit-difference data, including where to apply the bit-difference data, where to add the new data and where to move the unchanged data (i.e. move the contents of bytes $51_{V1 \& V2}$ to $70_{V1 \& V2}$ of the current version of the software to bytes $61_{V1 \& V2}$ to $80_{V1 \& V2}$ of the new version of the software). A move operation may only be performed if it does not overwrite data, otherwise a rollback would not work. Where a move operation would overwrite data, then a delta update, such as described and illustrated with reference to FIG. 5 may be used instead. Since the contents of bytes $51_{\nu 1 \& \nu 2}$ to $70_{\nu 1 \& \nu 2}$ is unchanged from the current version to the new version of the software they are not included in the delta update data, only a move instruction/change of address is required.

When rolling back a delta update which includes a move operation, the move operation is applied in reverse.

Although the data is moved in the example of FIGS. 4A and 4B as a result of the addition of new data, it is not necessary for new data to be added in order to move data.

FIG. 5 illustrates schematically alternative delta update data from that illustrated in FIG. 4B. The delta update data illustrated in FIG. 5 could also be applied to the current version of the software illustrated in FIG. 1A in order to generate the new version of the software illustrated in FIG. 4A. The software illustrated in FIG. 1A comprises 70 bytes of data. In the software illustrated in FIG. 4A, the first 50 bytes of the software ($1_{\nu 2}$ to $50_{\nu 2}$) have been changed, an additional 10 bytes of software ($51_{+\nu 2}$ to $60_{+\nu 2}$) has been added, and the last 20 bytes of software ($61_{\nu 1 \& \nu 2}$ to $80_{\nu 1 \& \nu 2}$) are unchanged but have moved location. Instead of detailing the change of location of the last 20 bytes in the metadata as discussed above with reference to FIG. 4B, the delta update data illustrated in FIG. 5 comprises the bit-difference data for the first 70 bytes of data and 10 additional bytes of data. Although the content of the last 20 bytes of the second version of the software have moved location from that of the first version of the data, in some instances it may be simpler to define the data as changed at the relevant bytes instead. The delta update data illustrated in FIG. 5 comprises data ($1_{XOR}$ to $70_{XOR}$) indicating the bit-level differences between the current version (FIG. 1A) and the new version (FIG. 4A) of the software, i.e. the output of the XOR operation for each bit of the changed 70 bytes, the 10 new bytes ($71_{+\nu 2}$ to $80_{+\nu 2}$) and metadata.

A new version of the software may also delete code. According to one embodiment, when the code to be deleted is being replaced with new code, then the bit-difference data may be used to determine the previous "deleted" data when rolling back. For example, the first 50 bytes of the software ($1_{\nu 2}$ to $50_{\nu 2}$) illustrated in FIG. 1A have been changed, (i.e. the original data has been deleted and replaced by new data), which is indicated by the bit-difference data.

However, in some embodiments, the deleted data may not be replaced with new data. In order to be able to successfully rollback from a delta update which deletes code, the deleted code must be stored at the device. For example, FIG. 6A illustrates schematically another new version of the software illustrated in FIG. 1A. In the software illustrated in FIG. 6A the first 50 bytes of the software ($1_{\nu 2}$ to $50_{\nu 2}$) have been changed and the last 20 bytes of the software have been deleted. FIG. 6B illustrates schematically delta update data for updating the software from the current version illustrated in FIG. 1A to the new version illustrated in FIG. 6A. The delta update data illustrated in FIG. 6B comprises data ($1_{XOR}$ to $50_{XOR}$) indicating the bit-level differences between the current version (FIG. 1A) and the new version (FIG. 6A) of the software, i.e. the output of the XOR operation for each bit of the changed 50 bytes, and metadata. The delta update data of FIG. 6B looks similar to that of FIG. 1C, however, the metadata of FIG. 6B defines how to apply the bit-difference data, including where to apply the bit-difference data, what data is to be deleted and an instruction that the deleted data should be saved with the delta update, such that rollback to the deleted data may be performed if required.

In addition to the operations described above, the metadata may also define other operations, such as, repeat/use same bit difference data for n bytes.

According to another embodiment, a new version of the software may only comprise additions and no changes to the existing software. According to this embodiment, the delta update data comprises the new data and metadata defining where to apply the new data.

According to another embodiment, a new version of the software may comprise a large quantity of changes, for example when a substantially part of the software, or every byte of the software, requires changing. When a large quantity of changes are required such that the delta update also becomes large, then it may be desirable to transmit the delta update data in stages, such that the device may update a first portion of the software, followed by a second portion of the software etc. According to this embodiment, the metadata associated with each stage of the update defines how the updates should be applied.

The methods described herein may be used with both large and constrained devices. However, the most benefit is likely to be seen in constrained devices which lack large memory and/or processing capabilities.

Figure 7:
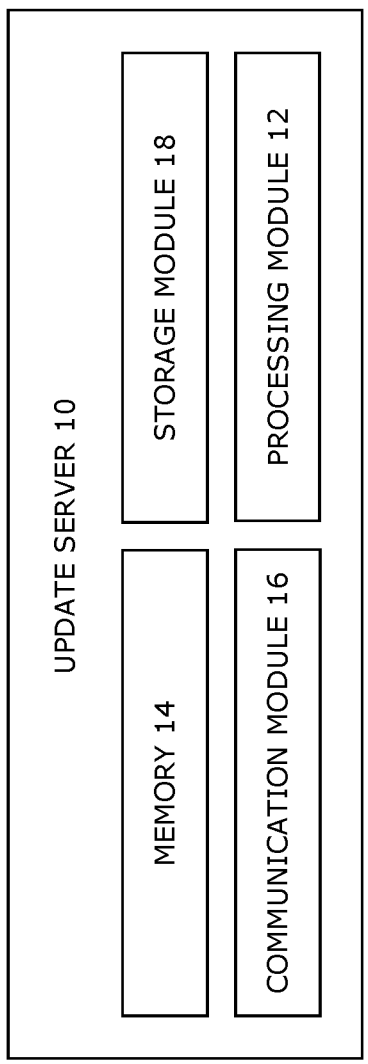
FIG. 7 illustrates schematically an update server.

FIG. 7 illustrates schematically an embodiment of an update server for creating the rollback-capable delta updates described herein. The server 10 comprises a processing module 12 configured to determine bit-level differences between at least a portion of the first version of the software and at least a portion of a second version of the software and to create a delta update to be applied to the first version of software to generate the second version of the software. The processing module 12 is coupled to at least one memory 14. The memory 14 may comprise program memory storing computer program code to determine the delta updates described herein, and working memory.

The server 10 also comprises a communication module 16 configured to transfer the delta update to one or more devices comprising the first version of the software and which require the second version of the software. The communication module may be configured to transfer the delta update via any one or more of the following: a Universal Serial Bus (USB), IEEE1394 interface, Ethernet, wireless network, and a parallel interface.

The server 10 also comprises a storage module 18 for storing the determined delta updates. The storage module 18 may be configured to communicate with the at least one processing module 12. The memory 14 and/or the storage module 18 may comprise a volatile memory such as random access memory (RAM), for use as temporary memory whilst the server 10 is operational. Additionally or alternatively, the memory 14 and the storage module 18 may comprise non-volatile memory such as Flash, read only memory (ROM) or electrically erasable programmable ROM (EE-PROM).

Figure 8:
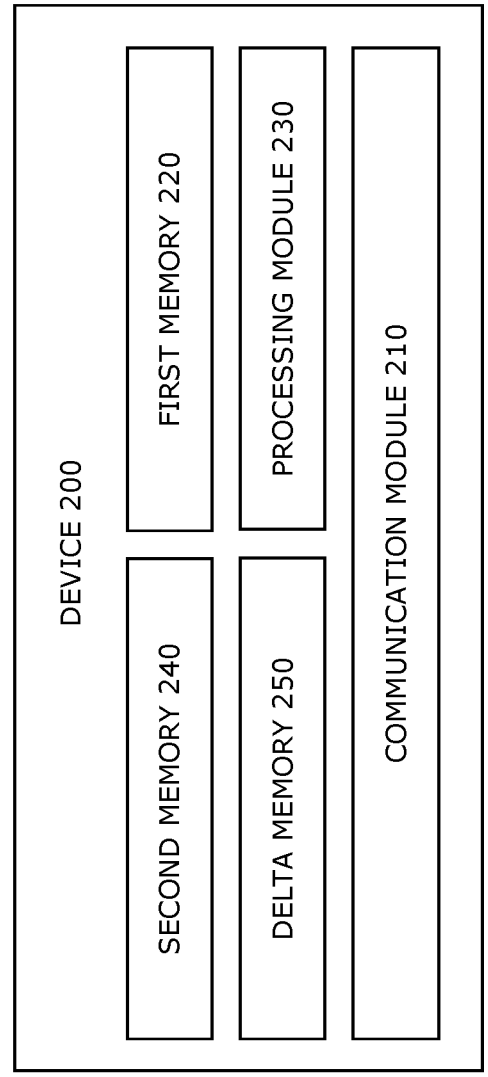
FIG. 8 illustrates schematically a device capable of installing software updates which may be rolled back.

FIG. 8 illustrates schematically an embodiment of a device 200 capable of installing software updates which may be rolled back as described herein. The device 200 may be a relatively large device having large capacity and capabilities, such as a laptop computer, tablet, smart phone etc, or may be a relatively constrained device having limited capacity and capabilities, such as a temperature sensor, healthcare monitor, electronic door lock etc.

The device 200 comprises a communications module 210 for communicating with, at least, an update server 10. The communication module 210 may use wireless communication such as WiFi™, Zigbee™, Bluetooth™, 6LoWPAN etc., or a cellular network, such as 3G, 4G, 5G etc. The communication module 210 may use wired communication or short-range communication such as radio frequency communication (RFID) or near field communication (NFC), if required.

The communications module 210 is configured to receive delta update data from an update server 10. The device 200 also comprises a first memory 220 configured to store the received delta update data. The first memory 220 may be a temporary memory. The first memory 220 is coupled to the communications module 210.

Second memory 240 provided at the device 200, stores computer program code to implement the functions of the device, for example, the memory may store the software which requires the delta updates. The device 200 also comprises a processing module 230 configured to communicate with the first memory 220, second memory 240, and the communication module 210. The processing module 230 comprises processing logic to process data and generate output signals in response to the processing, such as performing the delta updates described herein. The processing module 230 may also store the delta update data in a delta memory 250 following installation of the update, such that the delta update data is preserved at the device 200.

The delta storage memory 250 may form part of the first memory 220 or the second memory 240. In addition, the first memory and the second memory may form one memory module. One or more of the memories 220, 240, 250 may comprise volatile memory such as random-access memory (RAM), for use as temporary memory whilst the device 200 is operational, although when all of the memories 220, 240, 250 comprise volatile memory, the device may also comprise a non-volatile memory. Additionally, or alternatively, one or more of the memories 220, 240, 250 may comprise non-volatile memory such as Flash, read only memory (ROM) or electrically erasable programmable ROM (EEPROM), for storing data, programs, or instructions received or processed by the device 200.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on a user's device, partly on the user's device and partly on a remote server or entirely on the remote server. In the latter scenario, the remote computer may be connected to the user's device through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

As will be appreciated from the foregoing specification, techniques are described providing a method for performing a rollback-capable software update at a device.

In embodiments, the bit-difference data is applied to the at least the portion of the first version of the software using an XOR operation.

In embodiments, the preserved bit-difference data is applied to the at least the portion of the second version of the software using an XOR operation.

In embodiments, the bit-difference data is applied to the at least the portion of the first version of the software using an XNOR operation.

In embodiments, the preserved bit-difference data is applied to the at least the portion of the second version of the software using an XNOR operation.

In embodiments, the metadata further comprises additional data to be added to the first version of the software to generate the second version of the software and defines how to apply the additional data.

In embodiments, the metadata further defines at least a portion of the first version of the software to which the bit-difference data is not to be applied.

In embodiments, the metadata further defines where to move at least a portion of the first version of the software.

In embodiments, the metadata further defines where to move at least a portion of the first version of the software, and in the event of rollback of the update, rolling back from the second version of the software to the first version of the software by applying the move in reverse.

In embodiments, the metadata further defines at least a portion of the first version of the software which is to be deleted and data indicating that the deleted data is to be preserved with the delta update data in the memory.

In embodiments, the method further comprises: receiving the delta update data from a server prior to storing the delta update data in the memory.

In embodiments, the delta update data is stored in a temporary memory.

In embodiments, the delta update data is stored in a non-volatile memory.

In embodiments, the delta update data is preserved in a non-volatile memory.

In embodiments, one or more delta updates are preserved in the memory to enable rollback of one or more versions of the software.

In embodiments, a bootloader, at the device, applies the delta update data to the first version of the software to generate the second version of the software.

In embodiments, a bootloader, at the device, applies the preserved delta update data to the second version of the software to generate the first version of the software.

In embodiments, the method further comprises: storing and applying a first portion of a delta update data at the device prior to storing and applying a second portion of the delta update data at the device, wherein the metadata of the first portion of the delta update data defines how to apply the first portion of the delta update data and the metadata of the second portion of the delta update data defines how to apply the second portion of the delta update data.

In embodiments, a method for performing a rollback-capable software update at a device is provided. The method comprising: storing, in memory at the device, delta update data to be applied to a first version of software stored in the memory at the device, the delta update data comprising data indicating additions to the first version of the software and metadata defining where to apply the additions; applying the additions to the first version of the software to generate a second version of the software, and preserving in the memory the delta update data to enable a rollback of the update; and in the event of rollback of the update, rolling back from the second version of the software to the first version of the software by removing the additions from the second version of the software in accordance with the preserved metadata.

The invention claimed is:

1. A method for performing a rollback-capable software update at a device, the method comprising:
storing, in memory at the device, delta update data to be applied to a first version of software stored in the memory at the device, the delta update data comprising bit-difference data indicating bit-level differences between at least a portion of the first version of the software and at least a portion of a second version of the software and metadata defining at least one logical operation to apply the bit-difference data, the bit-difference data being obtained by applying the at least one logical operation to the at least a portion of the first version of the software and the at least a portion of the second version of the software, and wherein the metadata further defines at least one address indicating data of the first version of the software to be deleted and an instruction that the data of the first version to be deleted is to be preserved with the delta update data in the memory;
applying only the delta update data to replace in the memory the at least the portion of the first version of the software to generate the second version of the software, and preserving in the memory the delta update data and the data deleted from the first version to enable a rollback of the update; and
in the event of rollback of the update, rolling back from the second version of the software to the first version of the software by applying the preserved delta update data and the preserved data deleted from the first version to the at least a portion of the second version of the software in accordance with the at least one logical operation in the metadata in the preserved delta update data.

2. The method according to claim 1, wherein the bit-difference data is applied to the at least the portion of the first version of the software using an XOR operation.

3. The method according to claim 2, wherein the bit-difference data in the preserved delta update data is applied to the at least the portion of the second version of the software using an XOR operation.

4. The method according to claim 1, wherein the bit-difference data is applied to the at least the portion of the first version of the software using an XNOR operation.

5. The method according to claim 4, wherein the bit-difference data in the preserved delta update data is applied to the at least the portion of the second version of the software using an XNOR operation.

6. The method according to claim 1, wherein the metadata further comprises additional data, which is outside of the at least the portion of the first version of the software, to be added to the first version of the software to generate the second version of the software and defines where at a bit-level to apply the additional data.

7. The method according to claim 1, wherein the metadata further defines at least a portion of the first version of the software that is to be included in the second version of the software without applying the bit-difference data.

8. The method according to claim 1, wherein the metadata further defines where at a bit-level in the second version of the software to move at least a portion of the first version of the software.

9. The method according to claim 1, wherein the metadata further defines where to move at least a portion of the first version of the software, and in the event of rollback of the update, rolling back from the second version of the software to the first version of the software by applying the move in reverse.

10. The method according to claim 1, further comprising: receiving the delta update data from a server prior to storing the delta update data in the memory.

11. The method according to claim 1, wherein the delta update data is stored in a temporary memory.

12. The method according to claim 1, wherein the delta update data is stored in a non-volatile memory.

13. The method according to claim 1, wherein the delta update data is preserved in a non-volatile memory.

14. The method according to claim 1, wherein one or more delta updates are preserved in the memory to enable rollback of one or more versions of the software.

15. The method according to claim 1, wherein a bootloader, at the device, applies the delta update data to the first version of the software to generate the second version of the software.

16. The method according to claim 1, wherein a bootloader, at the device, applies the preserved delta update data to the second version of the software to generate the first version of the software.

17. The method according to claim 1, further comprising:
storing and applying a first portion of a delta update data at the device prior to storing and applying a second portion of the delta update data at the device, wherein the metadata of the first portion of the delta update data defines how to apply the first portion of the delta update data and the metadata of the second portion of the delta update data defines how to apply the second portion of the delta update data.

18. A non-transitory computer readable storage medium comprising program code for performing the methods of claim 1.

19. The method according to claim 1, wherein the metadata further defines repeated use of a bit difference data for a specified number of bytes.

* * * * *